(12) United States Patent
Mizutani (10) Patent No.: US 11,853,623 B2
(45) Date of Patent: Dec. 26, 2023

(54) NON-TRANSITORY COMPUTER READABLE MEDIUM AND METHOD FOR ADJUSTING BACKGROUND IMAGE INCLUDING REPEATING PATTERN IMAGE OR NON-REPEATING PATTERN IMAGE

(71) Applicant: BROTHER KOGYO KABUSHIKI KAISHA, Nagoya (JP)

(72) Inventor: Aiko Mizutani, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/750,242

(22) Filed: May 20, 2022

(65) Prior Publication Data

US 2022/0382492 A1 Dec. 1, 2022

(30) Foreign Application Priority Data

May 27, 2021 (JP) ................... 2021-089541

(51) Int. Cl.
*G06F 3/12* (2006.01)

(52) U.S. Cl.
CPC .......... *G06F 3/1208* (2013.01); *G06F 3/1242* (2013.01); *G06F 3/1251* (2013.01)

(58) Field of Classification Search
CPC .... G06F 3/1208; G06F 3/1242; G06F 3/1251; G01J 2003/2869; G06K 15/189; G03F 7/2026; G05B 2219/37066; G03B 15/10; G01T 1/1663; H04N 21/8153; H04N 5/272

See application file for complete search history.

(56) References Cited

U.S. PATENT DOCUMENTS

| | | | | |
|---|---|---|---|---|
| 2013/0262482 A1* | 10/2013 | Bogart | ............... | H04N 1/00196 707/751 |
| 2015/0138570 A1* | 5/2015 | Tsutsui | .................. | G06F 3/1208 358/1.2 |

FOREIGN PATENT DOCUMENTS

JP 2005-286613 A 10/2005

* cited by examiner

*Primary Examiner* — Juan M Guillermety
(74) *Attorney, Agent, or Firm* — KENEALY VAIDYA LLP (57) ABSTRACT

A non-transitory computer readable medium stores a printing processing program that causes a controller of a terminal device to execute a process for printing. The terminal device is connectable to a printing apparatus and including the controller and an operation unit. The printing apparatus is configured to print on a long printing medium to produce a printed matter. The process includes receiving a selection of a background image, determining whether the selected background image is a pattern image or a non-pattern image, in a case where the background image is the pattern image, not changing scale of the image pattern regardless of a width of the long printing medium and outputting printing data including background image data to the printing apparatus.

6 Claims, 9 Drawing Sheets

NON-TRANSITORY COMPUTER READABLE MEDIUM AND METHOD FOR ADJUSTING BACKGROUND IMAGE INCLUDING REPEATING PATTERN IMAGE OR NON-REPEATING PATTERN IMAGE

CROSS REFERENCE TO RELATED APPLICATIONS

This application is based on Japanese Patent Applications No. 2021-089541 filed on May 27, 2021, the entire contents of which are incorporated herein by reference.

BACKGROUND ART

The present invention relates to a printing processing program and a printing processing method.

In the related art, there has been a technique of printing on a label tape by a tape printer based on printing data obtained by combining background data in which image data of a background image is disposed and input data such as characters (for example, see JP-A-2005-286613).

In the related art described above, a size of an image based on the background image data to be printed on a printing medium may be appropriately expanded and contracted, but for this purpose, it is necessary to set magnification by a manual operation of a user. Therefore, the user needs to manually set whether to magnify the scale for each background image data, and there is room for further improvement in order to implement an efficient printing operation.

The present invention has been made to solve the matter described above in the related art. That is, an object of the present invention is to provide a printing processing program and a printing processing method capable of automatically determining whether a scale of background image data is to be changed according to a type of a background image, thereby making it possible to improve an efficiency of a printing operation.

According to the present invention, it is possible to automatically switch whether the size of the background image data is to be magnified according to the type of the background image, and to improve the efficiency of the printing operation.

SUMMARY

According to an aspect of the present disclosure, a non-transitory computer readable medium stores a printing processing program that causes a controller of a terminal device to execute a process for printing. The terminal device is connectable to a printing apparatus and including the controller and an operation unit. The printing apparatus is configured to print on a long printing medium to produce a printed matter. The process includes receiving a selection of a background image serving as a ground pattern of the printed matter through the operation unit, determining whether the background image selected by using the operation unit is a pattern image in which a given image pattern is repeated or a non-pattern image other than the pattern image, in a case where it is determined in the determining that the background image is the pattern image, not changing scale of the image pattern in first background image data corresponding to the pattern image regardless of a width of the long printing medium, in a case where it is determined in the determining that the background image is the non-pattern image, changing scale of second background image data corresponding to the non-pattern image in accordance with the width of the long printing medium, and outputting printing data including the first background image data or the second background image data to the printing apparatus.

According to another aspect of the present disclosure, a printing processing method is executed by a terminal device connected to a printing apparatus. The printing apparatus is configured to print on a long printing medium to produce a printed matter. The printing processing method includes receiving a selection of a background image serving as a ground pattern of the printed matter, determining whether the selected background image is a pattern image in which a predetermined image pattern is repeated or a non-pattern image other than the pattern image, in a case where it is determined in the determining that the background image is the pattern image, not changing scale of the image pattern in first background image data corresponding to the pattern image regardless of a width of the long printing medium, in a case where it is determined in the determining that the background image is the non-pattern image, changing scale of second background image data corresponding to the non-pattern image in accordance with the width of the long printing medium, and outputting printing data including the first background image data or the second background image data to the printing apparatus.

DESCRIPTION OF EMBODIMENTS

Hereinafter, an embodiment of the present invention will be described with reference to the drawings.

<Operation Terminal>

Figure 1A:
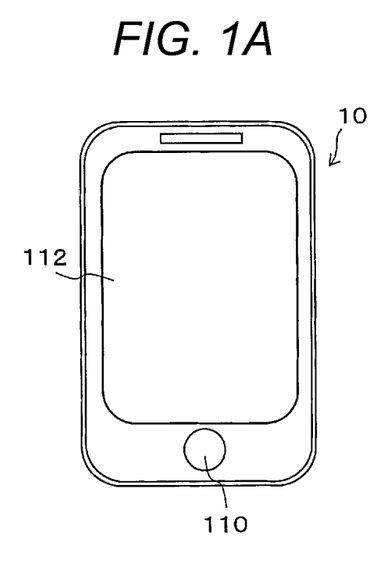
FIG. 1A is a front view showing an external appearance of an operation terminal according to an embodiment of the present invention.
Figure 1B:
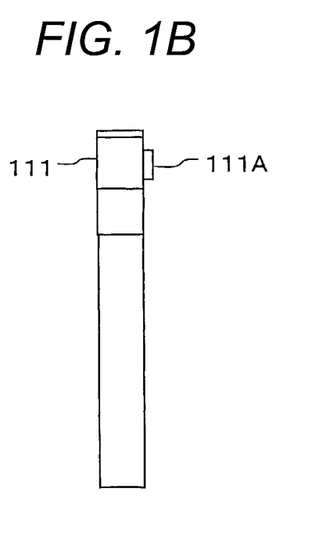
FIG. 1B is a right side view thereof.
Figure 1C:
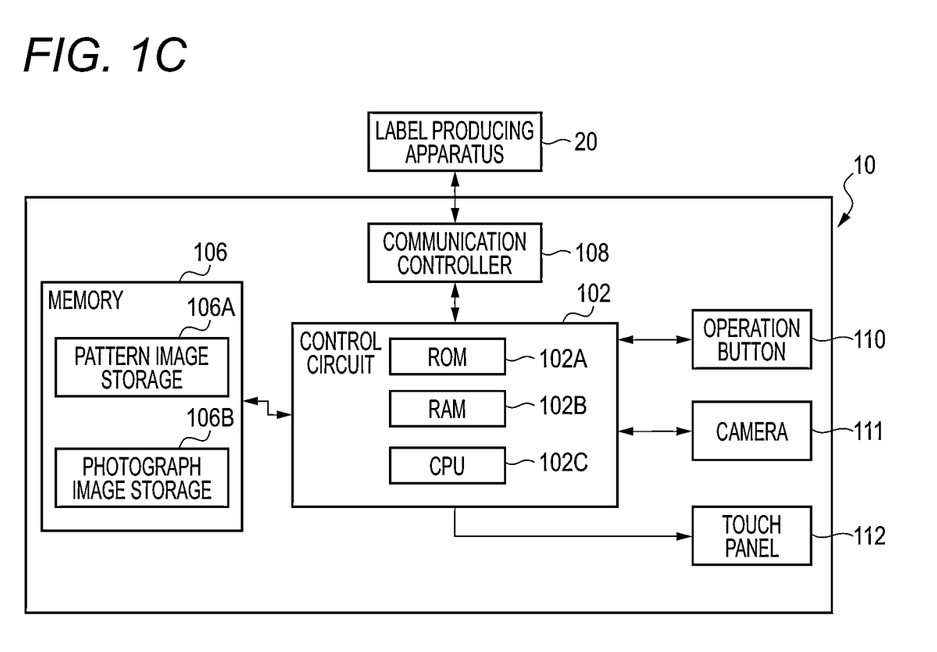
FIG. 1C is a functional block diagram showing a functional configuration of the operation terminal.

FIGS. 1A to 1C show an operation terminal 10 that executes a printing processing program according to the present embodiment.

The operation terminal 10 is connected to a label producing apparatus 20. The "connection" includes both wireless connection via an interface using Wi-Fi or Bluetooth and wired connection via a USB cable or the like. Bluetooth is a registered trademark of Bluetooth Special Interest Group (SIG). Wi-Fi is a registered trademark of the Wi-Fi Alliance.

The operation terminal 10 generates printing data for forming a desired image on a print-receiving tape (to be described later), and outputs the printing data to the label producing apparatus 20. The label producing apparatus 20 forms the image corresponding to the printing data acquired from the operation terminal 10 on the print-receiving tape to form a print label (to be described later). The operation terminal 10 is an example of a terminal device, and the label producing apparatus 20 is an example of a printing apparatus.

As shown in FIGS. 1A and 1B, the operation terminal 10 includes a touch panel 112, an operation button 110 with which an appropriate operation is performable by a user, and a camera 111 configured to capture an image of an object. The operation terminal 10 is an example of a smartphone in the drawing, and may be another information terminal that is connectable to the label producing apparatus 20 including a tablet computer. The touch panel 112 displays various kinds of information and allows the user to perform various operations. An operation function portion of the touch panel 112 and the operation button 110 are collectively referred to as the "operation unit 110 and the like" below as appropriate. The operation unit 110 and the like is an example of an operation unit.

The camera 111 includes a lens 111A, and is activated by the user operating the operation button 110 and the like to capture the image of the object.

As shown in FIG. 1C, the operation terminal 10 includes a control circuit 102, a memory 106, and a communication controller 108 in addition to the operation button 110, the camera 111, and the touch panel 112.

The control circuit 102 includes an ROM 102A, an RAM 102B, and a CPU 102C. The control circuit 102 executes various programs stored in the ROM 102A by a calculation function of the CPU 102C while using a temporary storage function of the RAM 102B. The various programs include the printing processing program according to the present embodiment for executing a flow of FIG. 8 described later. The control circuit 102 is an example of a controller.

The communication controller 108 performs control on information communication between the label producing apparatus 20 and the operation terminal 10. The control circuit 102 is configured to transmit and receive various types of information and data to and from the label producing apparatus 20 via the communication controller 108.

The memory 106 is, for example, a nonvolatile memory including an EEPROM, and includes a pattern image storage unit 106A and a photographic image storage unit 106B. The pattern image storage unit 106A stores a plurality of types of pattern images prepared in advance, in which a given pattern, an iconic image, a symbol, and the like (hereinafter, appropriately referred to as the "image patterns") are regularly repeated. The photographic image storage unit 106B stores, for example, a photographic image captured by the camera 111. In addition to the photographic image captured by the camera 111, the photographic image storage unit 106B also stores a photographic image appropriately acquired from an outside of the operation terminal 10 through the wireless communication or the like. The photographic image is an example of a non-pattern image.

<Label Producing Apparatus>

Figure 2:
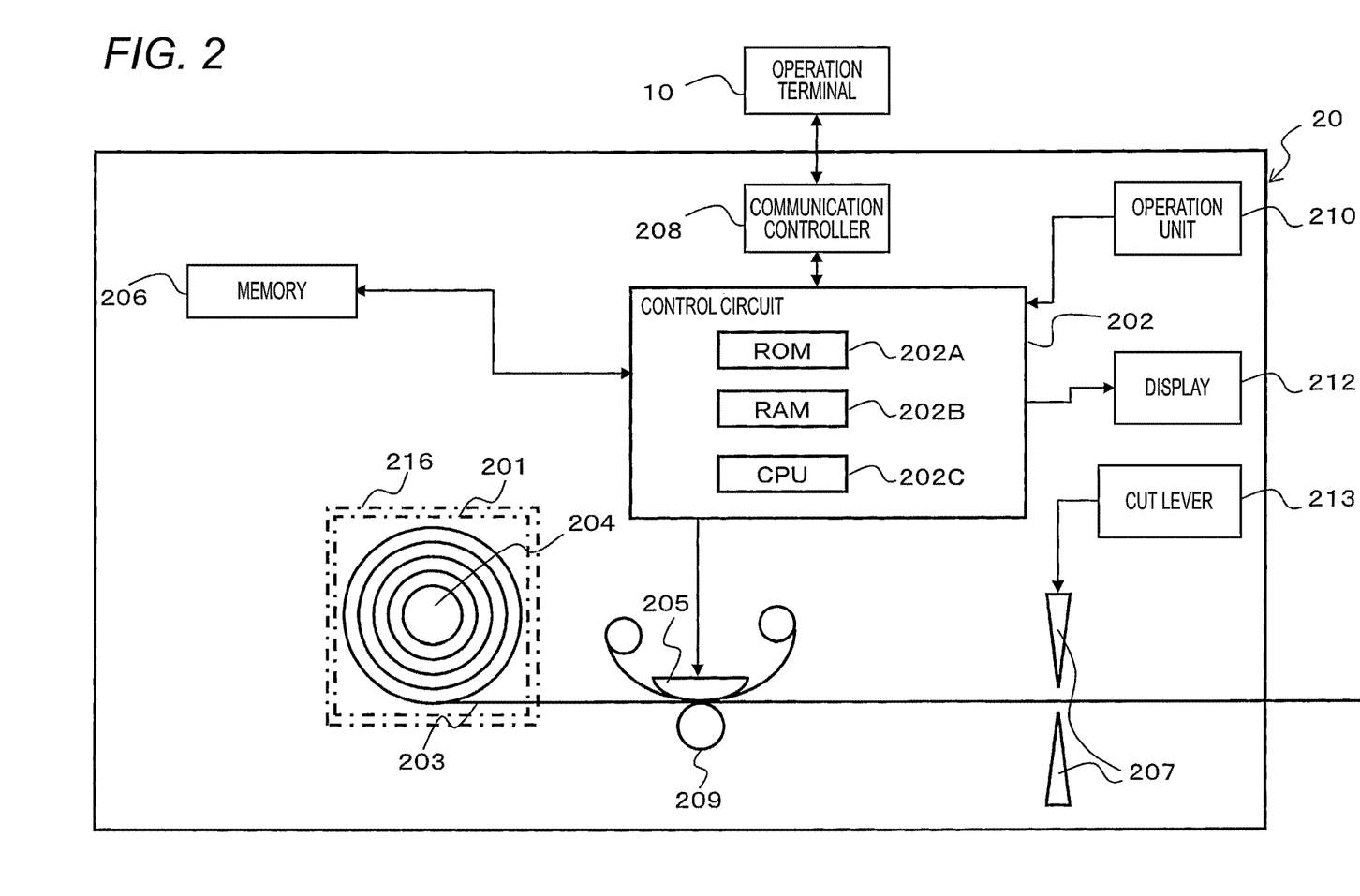
FIG. 2 is a functional block diagram showing a functional configuration of a label producing apparatus.

As shown in FIG. 2, the label producing apparatus 20 includes a cartridge holder 216, a conveying device 209, a printing head 205, a cutter 207, a display unit 212, an operation unit 210, a communication controller 208, a control circuit 202, and a memory 206.

The cartridge holder 216 is configured such that a cartridge 201 for supplying a print-receiving tape 203 is detachably attached thereto. The print-receiving tape 203 is an example of a long printing medium.

The conveying device 209 conveys the print-receiving tape 203 fed out from a tape roll 204 of the cartridge 201. The printing head 205 forms the desired image on the print-receiving tape 203 conveyed by the conveying device 209.

The cutter 207 is driven by the user operating a cut lever 213. The cutter 207 cuts the print-receiving tape 203 on which printing has been completed by the printing head 205, and generates the print label. The print label is an example of a printed matter.

The various operations is performable with the operation unit 210 by the user. The display unit 212 displays various kinds of information and various kinds of messages.

The control circuit 202 includes an ROM 202A, an RAM 202B, and a CPU 202C. The control circuit 202 executes various programs stored in the ROM 202A by a calculation function of the CPU 202C while using a temporary storage function of the RAM 202B. The control circuit 202 performs control on the label producing apparatus 20 including the conveying device 209 and the printing head 205.

The communication controller 208 performs control on information communication between the operation terminal 10 and the label producing apparatus 20. The control circuit 202 is configured to transmit and receive various types of information and data to and from the operation terminal 10 via the communication controller 208.

The memory 206 is, for example, a nonvolatile memory including an EEPROM, and configured to store various types of information.

<Production of Print Label>

In the present embodiment of the configuration described above, the printing data transmitted from the operation terminal 10 to the label producing apparatus 20 includes background image data for forming a background image serving as a ground pattern of the print label. The label producing apparatus 20 performs printing on the print-receiving tape 203 based on the transmitted background image data, and produces the print label. As the background image data included in the printing data, a content desired by the user is appropriately selectable. In the present embodiment, as a type of the background image data, any one of the two types of the pattern image in which the above-described image pattern is repeated and the photographic image is appropriately selectable and usable.

Examples of Print Label Based on Pattern Image

Figure 3A:
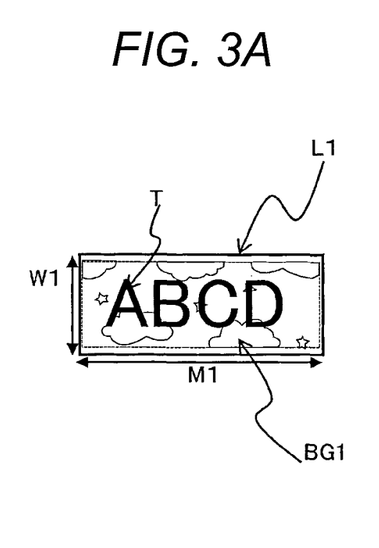
FIGS. 3A to 3C are explanatory diagrams showing examples of appearances of a print label generated based on pattern image data.
Figure 3B:
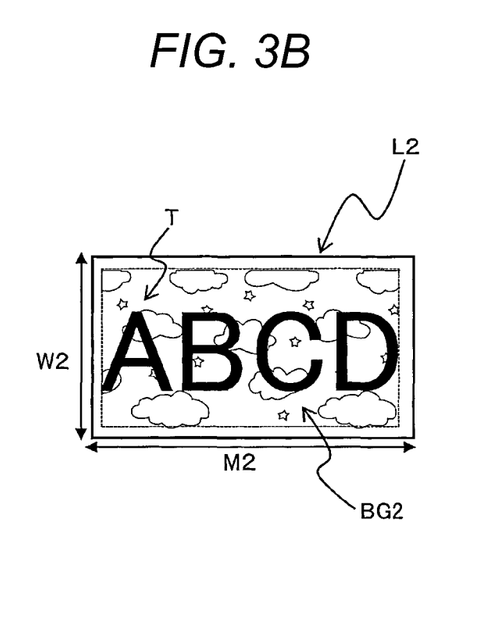
Figure 3C:
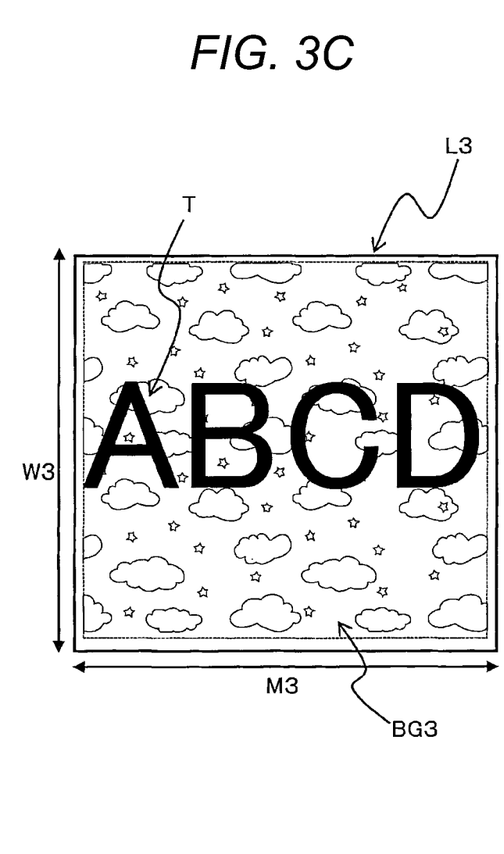

Examples of the print label generated using the pattern image are shown in FIGS. 3A to 3C. In FIGS. 3A to 3C, background images BG1, BG2, and BG3 (hereinafter collectively referred to as the "background image BG1 and the like" as appropriate) as the ground patterns are printed on print labels L1, L2, and L3 of the examples, and character strings T of "ABCD" are printed on the background images BG1, BG2, and BG3. Sizes of the print labels L1, L2, and L3 are different from each other, and the size of the print label L3 is the largest, the size of the print label L1 is the smallest, and the size of the print label L2 is intermediate. The size of each of the print labels L1 to L3 will be described in detail later.

In each of the background images BG1, BG2, and BG3, image patterns each having a small "star" shape are disposed between a plurality of image patterns having a "cloud" shape. In the present embodiment, in the print labels L1, L2, and L3 having different sizes, arrangement modes of the image patterns, that is, the "cloud" and the "stars" in this example, of the background images BG1, BG2, and BG3 are the same as well as the sizes of the image patterns and the intervals therebetween.

Examples of Print Label Based on Photographic Image

Figure 4A:
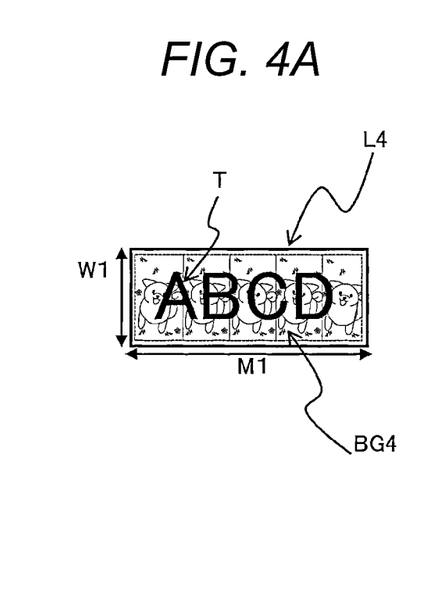
FIGS. 4A to 4C are explanatory diagrams showing examples of appearances of a print label generated based on photographic image data.
Figure 4B:
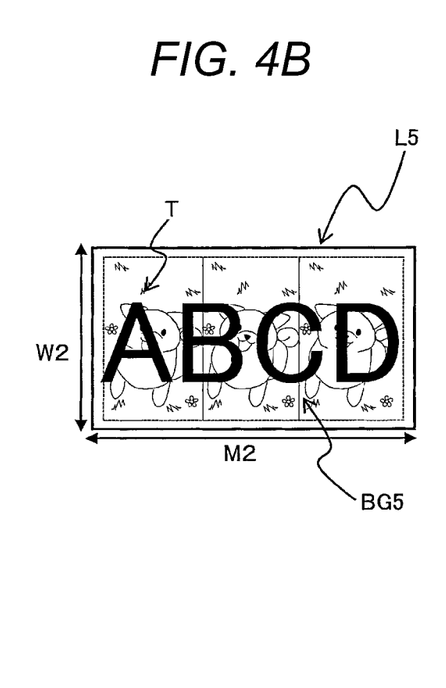
Figure 4C:
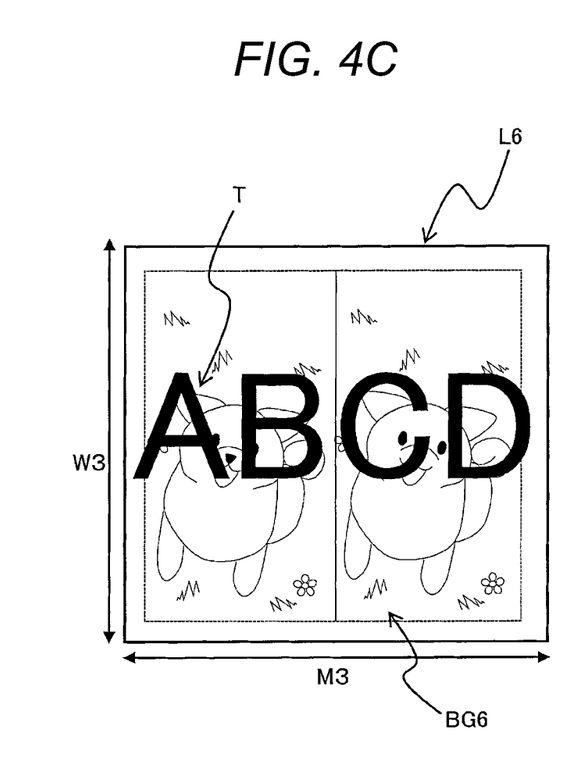

Examples of the print label generated using the photographic image are shown in FIGS. 4A to 4C. In FIGS. 4A to 4C, background images BG4, BG5, and BG6 (hereinafter collectively referred to as the "background image BG4 and the like" as appropriate) as the ground patterns are printed on print labels L4, L5, and L6 of the examples, and the character strings T of "ABCD" similar to the above are printed on the background images BG4, BG5, and BG6. Sizes of the print labels L4, L5, and L6 are different from each other, and the size of the print label L6 is the largest, the size of the print label L4 is the smallest, and the size of the print label L5 is intermediate. The size of each of the print labels L4 to L6 will be described in detail later.

In each of the background images BG4, BG5, and BG6, a photographic image of "dog" having the same content is repeatedly disposed a plurality of times. As another feature of the present embodiment, in the print labels L4, L5, and L6 having the sizes different from each other, scales and the number of repetitions of the photographic images constituting the background images BG4, BG5, and BG6 are different from each other. In this example, the photographic image is the image of "dog". Hereinafter, the print labels L1 to L3, L4 to L6, and the like are collectively referred to as a "print label L" as appropriate.

In the present embodiment, the print label is produced using the pattern image or the photographic image as described above. Hereinafter, details thereof will be described with reference to FIGS. 5A to 8.

<Image List Screen>

When the user operates the operation unit 110 and the like of the operation terminal 10, an appropriate image list screen 112A is displayed on the touch panel 112 based on the printing processing program according to the present embodiment described above (see FIGS. 5A and 5B). The image list screen 112A includes a pattern image selection button 112a, a photographic image selection button 112b, and a color selection button 112c. The pattern image selection button 112a is a button for selecting the pattern image as the background image, and the photographic image selection button 112b is a button for selecting the photographic image as the background image. The color selection button 112c will be described later.

Figure 5A:
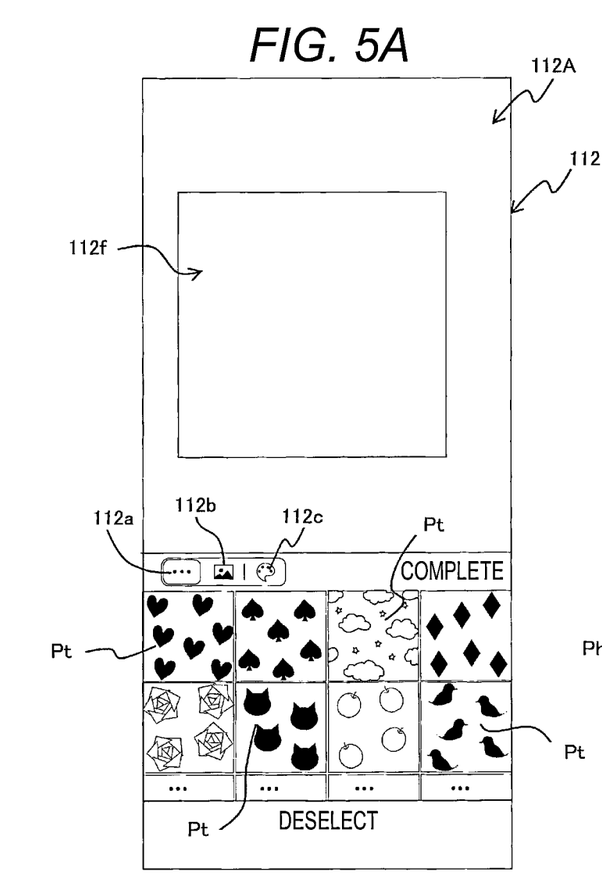
FIGS. 5A and 5B are explanatory diagrams showing examples of an image list screen displayed on the operation terminal.

FIG. 5A shows the image list screen 112A after the pattern image selection button 112a is selected. As shown in the drawing, thumbnails Pt of all the pattern images stored in the pattern image storage unit 106A are displayed in a list below the buttons 112a to 112c. One of the plurality of thumbnails Pt displayed in the list as the background image to be printed on the print label L is selectable by use's operation to the operation unit 110. The pattern image corresponding to the selected thumbnail Pt is displayed in an image display field 112f (not shown in FIG. 5A) provided above the image list screen 112A.

Figure 5B:
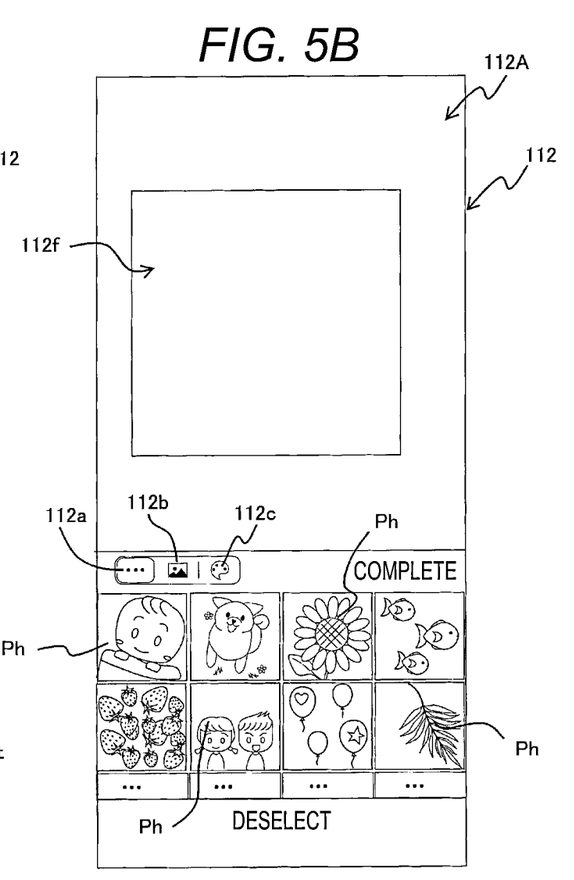

FIG. 5B shows the image list screen 112A after the photographic image selection button 112b is selected. As shown in the drawing, thumbnails Ph of all the photographic images stored in the photograph image storage unit 106B are displayed in a list below the buttons 112a to 112c. Even when aspect ratios of the photographic images vary, the thumbnails Ph obtained by trimming the photographic images into a substantially square shape are displayed in the list on the image list screen 112A. One of the plurality of thumbnails Ph displayed in the list as the background image to be printed on the print label L is selectable by user's operation to the operation unit 110. The photographic image corresponding to the selected thumbnail Ph is displayed in the image display field 112f (not shown in FIG. 5B) provided above the image list screen 112A.

<Tape Width Selection Screen>

When the user selects one pattern image or one photographic image on the image list screen 112A of FIG. 5A or FIG. 5B, a tape width selection screen 112B for selecting a width of the print-receiving tape 203 is displayed on the touch panel 112.

Figure 6A:
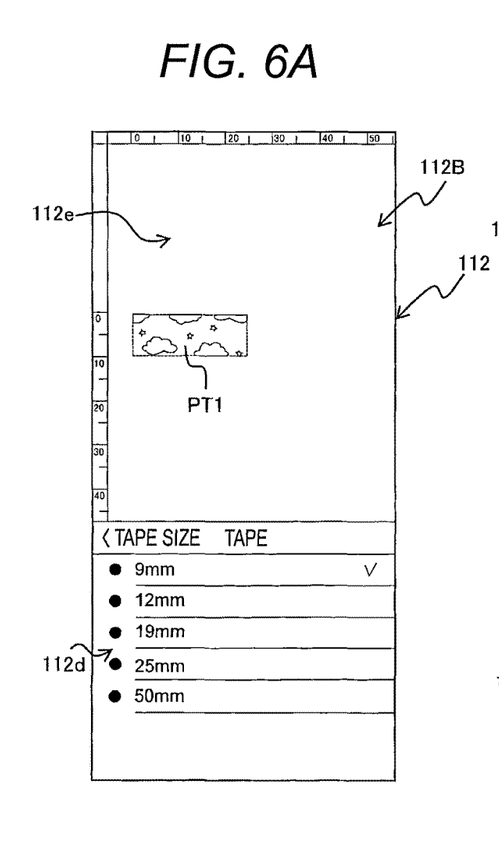
FIGS. 6A to 6C are explanatory diagrams showing examples of a tape width selection screen displayed on the operation terminal.
Figure 6B:
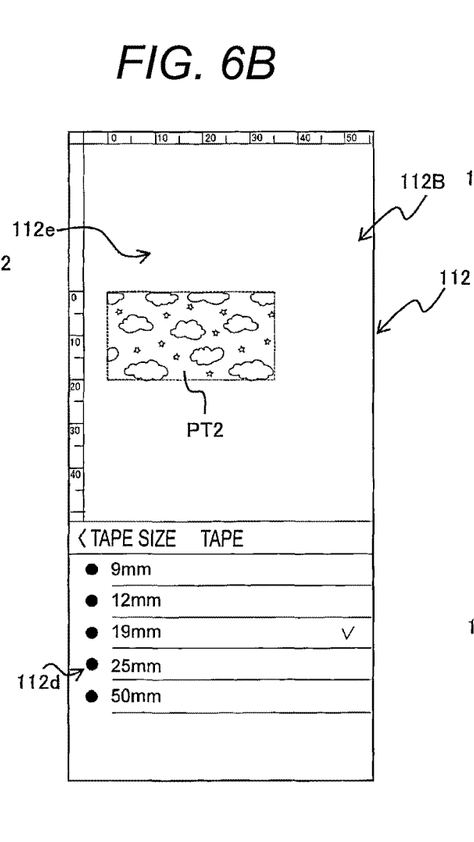
Figure 6C:
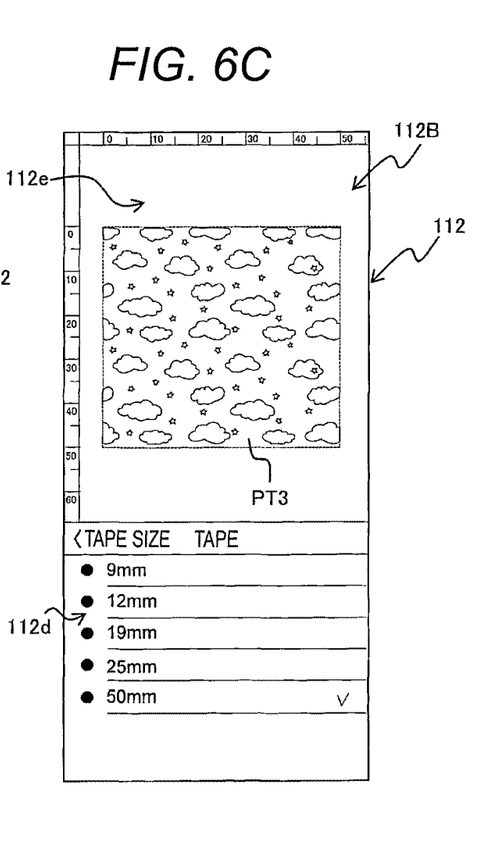

The tape width selection screen 112B displayed when the thumbnail Pt is selected on the image list screen 112A of FIG. 5A is shown in FIGS. 6A to 6C.

As shown in FIGS. 6A to 6C, in the tape width selection screen 112B, a tape width selection field 112d is provided in a lower portion, and a background image preview field 112e is provided in an upper portion. A plurality of types of selectable tape widths of the print-receiving tape 203 are displayed in the tape width selection field 112d. In this example, five tape widths of "9 mm", "12 mm", "19 mm", "25 mm", and "50 mm" is selectable.

FIG. 6A shows a state in which the tape width "9 mm" of the tape width selection field 112d is selected by the user's operation to the operation unit 110 and the like. In this case, as shown in the drawing, in the background image preview field 112e, one pattern image PT1 corresponding to the selected thumbnail Pt described above is displayed as a preview of the background image of the print label L having the tape width of 9 mm.

Similarly, FIGS. 6B and 6C show states in which the tape widths "19 mm" and "50 mm" in the tape width selection field 112d are selected, respectively. In the background image preview fields 112e, pattern images PT2 and PT3 corresponding to the selected thumbnails Pt are displayed as previews of the background images of the print labels L having the tape widths of "19 mm" and "50 mm", respectively. The previewed pattern images PT1, PT2, and PT3 are examples of first background image data. Hereinafter, the pattern images PT1, PT2, and PT3 are collectively referred to as a "pattern image PT" as appropriate.

As shown in FIGS. 6A to 6C, in each of the pattern images PT1, PT2, and PT3, the image patterns having the small "star" shape is disposed between the plurality of image patterns having the "cloud" shape. In the pattern images PT1, PT2, and PT3 having the sizes different from each other corresponding to the difference in the tape width setting described above, the image pattern are the same. The image pattern means the arrangement modes of the "cloud" and the "stars" which includes the sizes thereof, and the intervals therebetween. Scales of the "cloud" and the "stars" in one image pattern are always constant even if the tape width setting of the print-receiving tape 203 is changed.

Figure 7A:
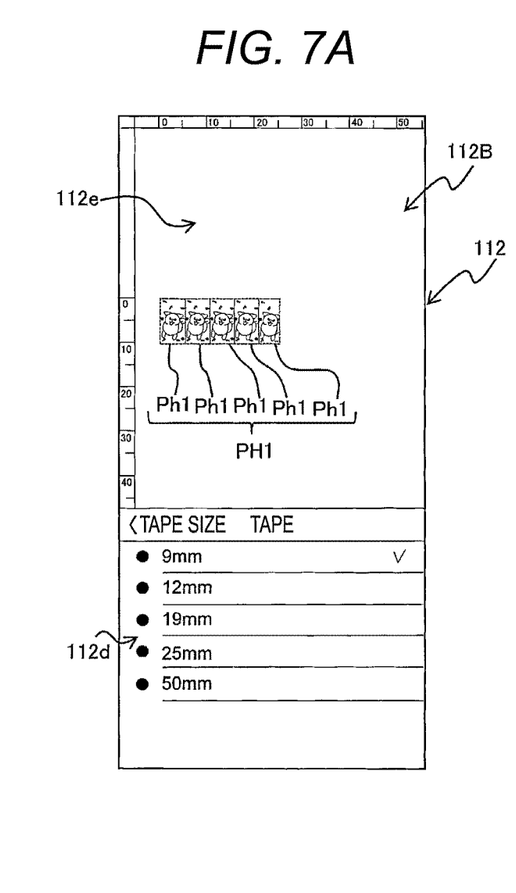
FIGS. 7A to 7C are explanatory diagrams showing another examples of the tape width selection screen displayed on the operation terminal.
Figure 7B:
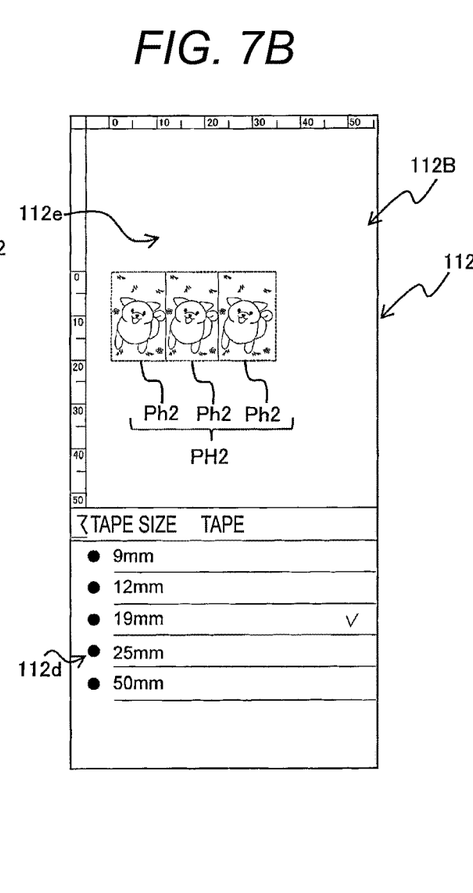
Figure 7C:
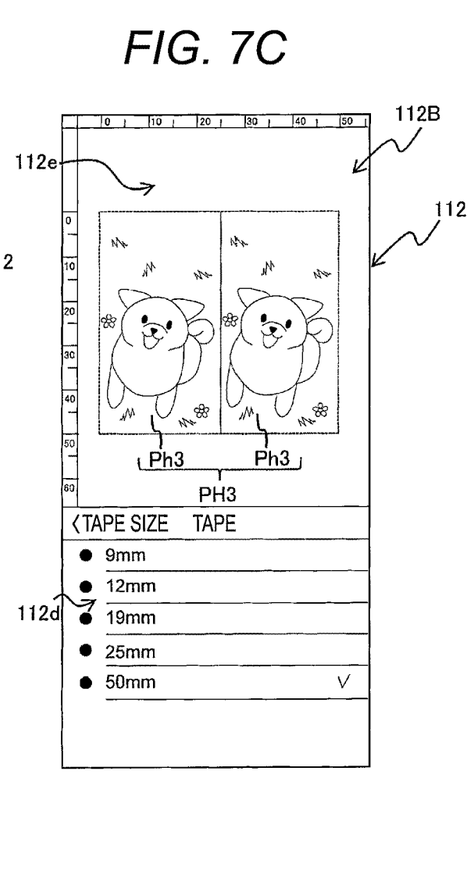

The tape width selection screen 112B displayed when the thumbnail Ph is selected on the image list screen 112A of FIG. 5B is shown in FIGS. 7A to 7C.

In FIGS. 7A to 7C, similarly to FIG. 6A to 6C, the tape width selection screen 112B includes the tape width selection field 112d and the background image preview field 112e. In the tape width selection field 112d, the tape widths of "9 mm", "12 mm", "19 mm", "25 mm", and "50 mm" is selectable.

FIG. 7A shows a state in which the tape width "9 mm" of the tape width selection field 112d is selected by the user's operation to the operation unit 110 and the like. In the background image preview field 112e, a photographic image body PH1 obtained by repeating one photographic image Ph1 corresponding to the thumbnail Ph five times in a tape length direction is displayed as a preview of the background image of the print label L having the tape width of 9 mm.

Similarly, FIGS. 7B and 7C show states in which the tape widths "19 mm" and "50 mm" in the tape width selection field 112d are selected, respectively. In the background image preview fields 112e, the photographic image bodies PH2 and PH3 are displayed as previews of the background images of the print labels L having the tape widths of "19 mm" and "50 mm", respectively.

In the photographic image body PH2, in response to a fact that the tape width is larger than 9 mm described above relating to the photographic image Ph1, one photographic image Ph2 corresponding to the thumbnail Ph is enlarged and magnified more than the photographic image Ph1. Further, the number of repetitions of the photographic image Ph2 in the tape length direction is reduced to three.

In the photographic image body PH3, in response to a fact that the tape width is further increased, one photographic image Ph3 corresponding to the thumbnail Ph is further enlarged and magnified, and the number of repetitions of the photographic image Ph3 in the tape length direction is further reduced to two.

As described above, in the image bodies PH1, PH2, and PH3 having the dimensions different from each other corresponding to the difference in the tape width setting, vertical directions of the photographic images Ph1, Ph2, and Ph3 coincides with a tape width direction of the print-receiving tape 203. The dimensions, in particular, the vertical-direction-dimensions of the photographic images Ph1, Ph2, and Ph3 are magnified in accordance with the tape width setting of the print-receiving tape 203 (referring to S70 and S95 to be described later). The number of repetitions when the photographic images Ph1, Ph2, and Ph3 are repeated a plurality of times along a length direction of the print-receiving tape 203 are set to be variable in accordance with the tape width setting of the print-receiving tape 203 (referring to S70 and S95 to be described later).

The photographic images Ph1, Ph2, and Ph3 of the previewed photographic image bodies PH1, PH2, and PH3 are examples of second background image data. Hereinafter, as appropriate, the photographic images Ph1, Ph2, and Ph3 are collectively referred to as a "photographic image Ph", and the photographic image bodies PH1, PH2, and PH3 are collectively referred to as a "photographic image body PH".

<Appearances of Generated Print Label>

Returning to FIG. 3A to FIG. 3C, the print labels L1, L2, and L3 are examples when the print labels L1, L2, and L3 are respectively printed corresponding to the setting and display on the tape width selection screen 112B shown in FIG. 6A to FIG. 6C.

On the print labels L1, L2, and L3, the background images BG1, BG2, and BG3 corresponding to the pattern images PT1, PT2, and PT3 of FIGS. 6A, 6B, and 6C, respectively, are printed as the ground patterns. Widths W1, W2, and W3 of the print labels L1, L2, and L3 satisfy, based on the tape width setting on the tape width selection screen 112B of FIG. 6A to FIG. 6C, W1<W2<W3, specifically, W1=9 [mm], W2=19 [mm], and W3=50 [mm]. Lengths M1, M2, and M3 of the print labels L1, L2, and L3 have, for example, appropriate lengths corresponding to a print length necessary for printing the character strings "ABCD" and the widths W1, W2, and W3, and satisfy M1<M2<M3.

Returning to FIG. 4A to FIG. 4C, the print labels L4, L5, and L6 are examples when the print labels L4, L5, and L6 are respectively printed corresponding to the setting and display on the tape width selection screen 112B shown in FIG. 7A to FIG. 7C.

On the print labels L4, L5, and L6, the background images BG4, BG5, and BG6 corresponding to the photographic image bodies PH1, PH2, and PH3 of FIGS. 7A, 7B, and 7C, respectively, are printed as the ground patterns. In the same manner as described above, the widths W1, W2, and W3 of the print labels L4, L5, and L6 are W1=9 [mm], W2=19 [mm], and W3=50 [mm] based on the tape width setting on the tape width selection screen 112B of FIG. 7A to FIG. 7C. The lengths M1, M2, and M3 of the print labels L4, L5, and L6 have appropriate lengths corresponding to the print length of the character strings "ABCD" and the widths W1, W2, and W3, and satisfy M1<M2<M3.

<Control Procedure>

In order to implement the method described above, a control procedure executed by the control circuit 102 of the operation terminal 10 based on the printing processing program according to the present embodiment will be described with reference to a flowchart of FIG. 8. By performing this flowchart, the printing processing method according to the present embodiment is executed.

In S10, the screen for receiving the selection of the background image when the print label L is to be produced is displayed, and in S20, the selection of the user by the operation on the operation unit 110 and the like is received. Specifically, for example, the image list screen 112A of FIG. 5A or FIG. 5B is displayed by default on the touch panel 112, and selection of either the pattern image selection button 112a or the photographic image selection button 112b is received. Alternatively, an appropriate screen other than the image list screen 112A including the pattern image selection button 112a or the photographic image selection button 112b may be displayed, and the selection of the button 112a or 112b may be received on the screen. S20 is an example of a selection receiving step.

In S30, it is determined whether the ground image selected in S20 is the pattern image. Specifically, it is determined whether the pattern image selection button 112a is selected. S30 is an example of an image determining step. The determination may be not performed based on which of the pattern image selection button 112a and the photographic image selection button 112b is selected, and another method may be used. For example, the thumbnails Pt and Ph of all the pattern images and the photographic images stored in the operation terminal 10 may be displayed, and it may be determined whether one thumbnail selected by the user is the pattern image or the photographic image by appropriate image analysis.

When the pattern image selection button 112a is selected, the determination in S30 is Yes, and the thumbnails Pt of all the pattern images stored in the pattern image storage unit 106A are displayed in the list on the image list screen 112A in S35 (see FIG. 5A).

In S40, the selection of one pattern image among the pattern images displayed in the list in S35 is received through the operation of the operation unit 110 and the like by the user. In S45, in response to the selection of the pattern image in S40, the tape width selection screen 112B (see FIGS. 6A to 6C) is displayed on the touch panel 112, and the selection of the width of the print-receiving tape 203 in the tape width selection field 112d is received.

In S50, one pattern image PT corresponding to the selection in S40 is displayed on the tape width selection screen 112B (see FIGS. 6A to 6C) in a dimension corresponding to the tape width selection in S45 without changing the scale of the image pattern. Thereafter, the control procedure proceeds to S80 to be described later.

When the photographic image selection button 112b is selected instead of the pattern image selection button 112a in S30, the determination is No, and the thumbnails Ph of all the photographic images stored in the photographic image storage unit 106B are displayed in the list on the image list screen 112A in S55 (see FIG. 5B).

In S60, the selection of one photographic image among the photographic images displayed in the list in S55 is received through the operation of the operation unit 110 and the like by the user. In S65, in response to the selection of the photographic image in S60, the tape width selection screen 112B (see FIGS. 7A to 7C) is displayed on the touch panel 112, and the selection of the width of the print-receiving tape 203 in the tape width selection field 112d is received.

In S70, the photographic image body PH is displayed on the tape width selection screen 112B (see FIGS. 7A to 7C). In the photographic image body PH, the photographic images Ph corresponding to the selection in S60 are enlarged or reduced to a dimension corresponding to the tape width selection in S65 and repeatedly disposed. Thereafter, the control procedure proceeds to S80.

In S80, based on a determination result in S30, image selection information indicating which of the pattern image and the photographic image is selected by the user is registered and stored in, for example, the memory 106. In S85, it is determined whether an operation of changing the tape width setting of the above-described print-receiving tape 203 is performed. Specifically, it is determined whether another tape width is newly selected in a state in which any one of "9 mm", "12 mm", "19 mm", "25 mm", and "50 mm" is selected and the corresponding preview is executed in FIGS. 6A to 6C or FIGS. 7A to 7C described above.

When another tape width is not selected, the determination in S85 is No, and the control procedure proceeds to S100 to be described later. When another tape width is selected, the determination in S85 is Yes, and resetting processing corresponding to the image selection information registered in S80 is performed in S95.

When the image selection information is "selection of pattern image", a dimension of one pattern image PT corresponding to the selection in S40 is changed to a dimension corresponding to the new tape width selection in S85 and displayed on the tape width selection screen 112B (see FIGS. 6A to 6C). At this time, as described above, the scale of the image pattern is not changed.

When the image selection information is "selection of photographic image", a new photographic image body PH is displayed on the tape width selection screen 112B (see FIGS. 7A to 7C). In the photographic image body PH, the scale of the photographic image Ph corresponding to the selection in S60 is changed to a scale corresponding to the new tape width selection in S85, and the number of repetitions is changed as necessary.

In S100, it is determined whether an operation of changing the selection of the background image is performed. In a state in which the "pattern image" is selected in S20 and the process is performed in S30→S35→ . . . →S50→S80→ . . . →S100, when the user returns to image list screen 112A of FIGS. 5A and 5B by an appropriate operation and the photographic image selection button 112b is selected, the determination in S100 is Yes. In a state in which the "photographic image" is selected in S20 and the process is performed in S30→S55→S70→ . . . →S80→ . . . →S100, when the user returns to the image list screen 112A of FIGS. 5A and 5B by an appropriate operation and the pattern image selection button 112a is selected, the determination thereof is also Yes.

When the determination is Yes as described above, the control procedure returns to S10. In cases other than the above, the determination in S100 is No, and in S105, the printing data including all the image data obtained by finishing processing of S10 to S100 is output to the label producing apparatus. S105 is an example of a data outputting step.

Effects of Embodiment

As described above, in the present embodiment, when the user selects the background image via the operation unit 110 and the like, a selection result thereof is received in S20. The type of the selected background image, that is, whether the background image is the pattern image in which the image pattern is repeated or the photographic image is determined in S30.

When it is determined that the pattern image is selected, the scale of the image pattern in the corresponding pattern image PT is not particularly adjusted in S50, S70, and S95. On the other hand, when it is determined that the photographic image is selected, the scale of the corresponding photographic image Ph is adjusted in accordance with the width of the print-receiving tape 203 in S50, S70, and S95.

The printing data including the pattern image PT in which the scale is not adjusted or the photographic image Ph in which the scale is adjusted is output to the label producing apparatus 20 in S105. The label producing apparatus 20 executes printing related to the printing data output in S105. According to the present embodiment, whether the scale of the image is to be changed is automatically determined according to the type of the selected background image, and therefore the printing operation is efficiently performed.

In the present embodiment, in particular, when the background image is the photographic image, the photographic image Ph adjusted in scale is repeated a plurality of times in the longitudinal direction of the print-receiving tape 203 in S50, S70, and S95. The number of repetitions at this time are set to be variable in accordance with the width of the print-receiving tape 203 (see FIGS. 4A to 4C and 7A to 7C).

According to the present embodiment, when the background image is the photographic image and is adjusted in scale, the magnified photographic image Ph is automatically repeated, and the number of repetitions is also automatically determined in accordance with the width of the print-receiving tape 203. According to the present embodiment, the ground patterns of the print labels L4, L5, and L6 may be appropriately formed by repeatedly using the background image selected by the user.

In the present embodiment, in particular, when the background image is the photographic image, in S50, S70, and S95, the magnification is performed such that the vertical-direction-dimension of the photographic image Ph coincides with the width-direction-dimension of the print-receiving tape 203 while the vertical direction of the photographic image Ph coincides with the width direction of the print-receiving tape 203 (see FIGS. 4A to 4C and 7A to 7C). According to the present embodiment, the ground pattern of the print label L may be appropriately formed by magnifying the background image selected by the user in accordance with the width-direction-dimension of the print-receiving tape 203.

<Modification>

The present invention is not limited to the above-described embodiment and various modifications may be made within the scope not deviating from the gist and technical idea thereof. Hereinafter, such modifications will be described in order.

Figure 9A:
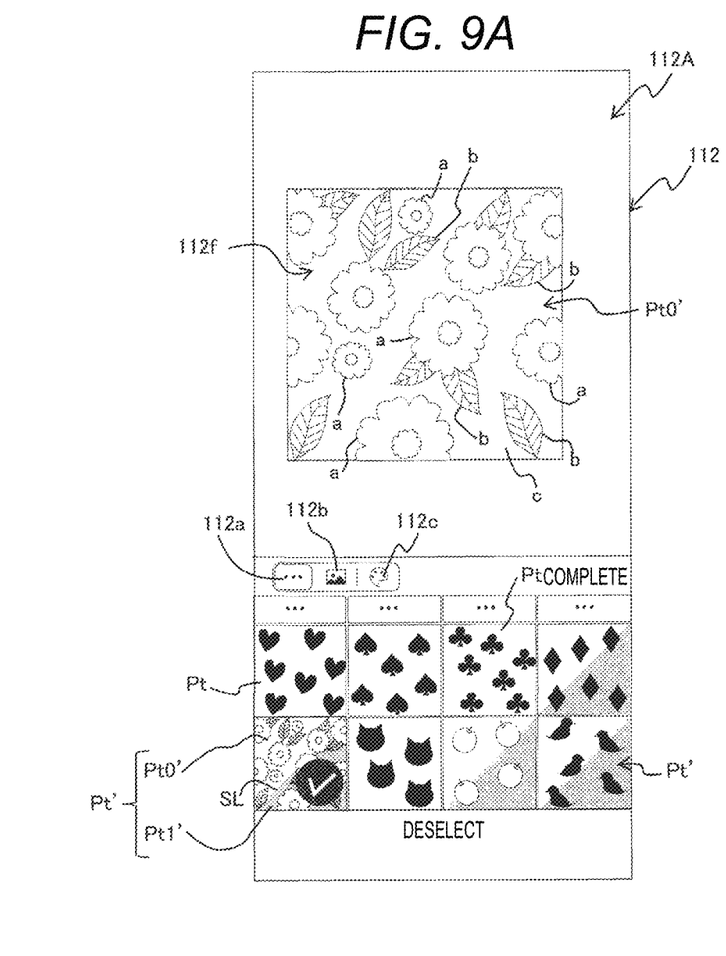
FIGS. 9A and 9B are explanatory diagrams showing an example of an image list screen and a pattern color setting screen displayed on an operation terminal in a modification in which a pattern image includes a transparent region and a non-transparent region.

(1) When a Pattern Image Includes a Transparent Region and a Non-Transparent Region, FIG. 9A shows an example of the image list screen 112A displayed on the touch panel 112 of the operation terminal 10 according to the present modification. As described above with reference to FIG. 5A, thumbnails of pattern images are displayed in the list below the buttons 112a to 112c. In the present modification, pattern images, specific pattern images each divided into the transparent region and the non-transparent region, and normal pattern images having no such division, in other words, all of which are non-transparent regions, are prepared in advance so as to be selectable. In the shown example, a plurality of thumbnails Pt' respectively corresponding to specific pattern images and a plurality of thumbnails Pt corresponding to normal pattern images similar to those in the above-described embodiment are displayed in a mixed manner in a list. Hereinafter, the thumbnails Pt' and Pt are referred to as "specific thumbnails Pt'" and "normal thumbnails Pt" as appropriate.

FIG. 9A shows a state in which one specific thumbnail Pt' is selected by a user through an operation of the operation unit 110 and the like (see a mark "√"). The specific pattern image corresponding to the specific thumbnail Pt' includes the transparent region and the non-transparent region as described above. The transparent region may be set to a color desired by the user by color selection (to be described later) triggered by an operation of the color selection button 112c.

When the thumbnails are displayed in the list as described above, a default color pattern image Pt0' and a color-changed pattern image Pt1' are displayed on an upper left portion and a lower right portion of the specific thumbnail Pt' with a diagonal line SL in an oblique direction interposed therebetween. The default color pattern image Pt0' represents a state in which transparent region is set to the default color, and the color-changed pattern image Pt1' represents a state in which the transparent region is set appropriately to a color other than the default color.

In FIG. 9A, the default color pattern image Pt0' corresponding to the selected specific thumbnail Pt' is displayed in the image display field 112f. The default color pattern image Pt0' includes a plurality of kinds of large and small image patterns a having a shape of "flower" and a plurality of kinds of image patterns b having a shape of "leaf". Internal areas of the shape of the flower of the image patterns a are the non-transparent regions. Internal areas of the image patterns b, that is, portions of the leaf shape other than leaf veins are the transparent regions. Further, in the default color pattern image Pt0', a base area c other than the image patterns a and b is also the transparent region.

Although detailed description thereof is omitted, the default color pattern image Pt0', together with a color-changed pattern image Pt1' to be described later, has a layered structure of a plurality of layers, that is, layers in terms of data.

In the non-transparent region, a given color setting is defined in an uppermost layer among the plurality of layers, and as a result, no matter what color setting is made in layers lower than the uppermost layer, the setting thereof is not reflected in appearance and the color setting of the uppermost layer is visually recognized.

In the transparent region, the color setting is not defined in the uppermost layer among the plurality of layers, and as a result, the color setting in the layers lower than the uppermost layer is directly reflected and visually recognized in appearance. In the present modification, by using this property, a color of the internal areas of the image patterns b and the base area c is changeable to a color desired by the user by the operation of the color selection button 112c.

Figure 9B:
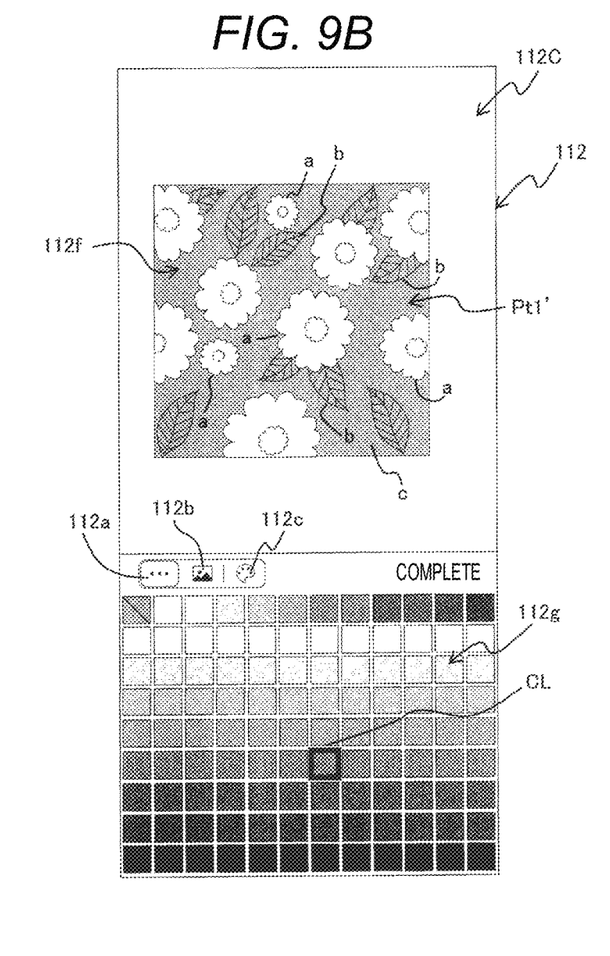

In FIG. 9A, after the color-changed pattern image Pt1' is selected from one specific thumbnail Pt' as indicated by the "mark √", a pattern color setting screen 112C shown in FIG. 9B is displayed on the touch panel 112.

As shown in the drawing, a color palette 112g for setting the color of the transparent region is provided in a lower portion of the pattern color setting screen 112C. In the shown example, one color segment CL is selected from a large number of color segments displayed on the color palette 112g by an appropriate operation via the operation unit 110 and the like. Correspondingly, a color-changed pattern image Pt1' in which the color of the internal areas of the image patterns b and the base area c is changed to the color of the color segment CL is displayed in the image display field 112f.

In FIG. 9A, when the normal thumbnail Pt is selected, the pattern color setting screen 112C is not displayed on the touch panel 112, or the pattern color setting screen 112 is displayed on the touch panel 112 but color selection by the color selection button 112c cannot be performed (not shown).

According to the present modification, by using the specific pattern image as the pattern image, the color of a part of the region, that is, the transparent region, is changeable to the color desired by the user. Therefore, convenience is further improved.

(2) Others

As described above, when the photographic image is selected as the background image, the printing data generated by performing magnification processing or the like on the photographic image is transmitted to the label producing apparatus 20, whereas the present invention is not limited thereto. That is, the printing data may be generated by performing the same processing as described above using a processed image obtained by performing appropriate processing such as contrast change, hue change, masking, and binarization on the photographic image.

As described above, arrows shown in FIG. 1C, FIG. 2, and the like indicate an example of a flow of signals, and do not limit flow directions of the signals.

Figure 8:
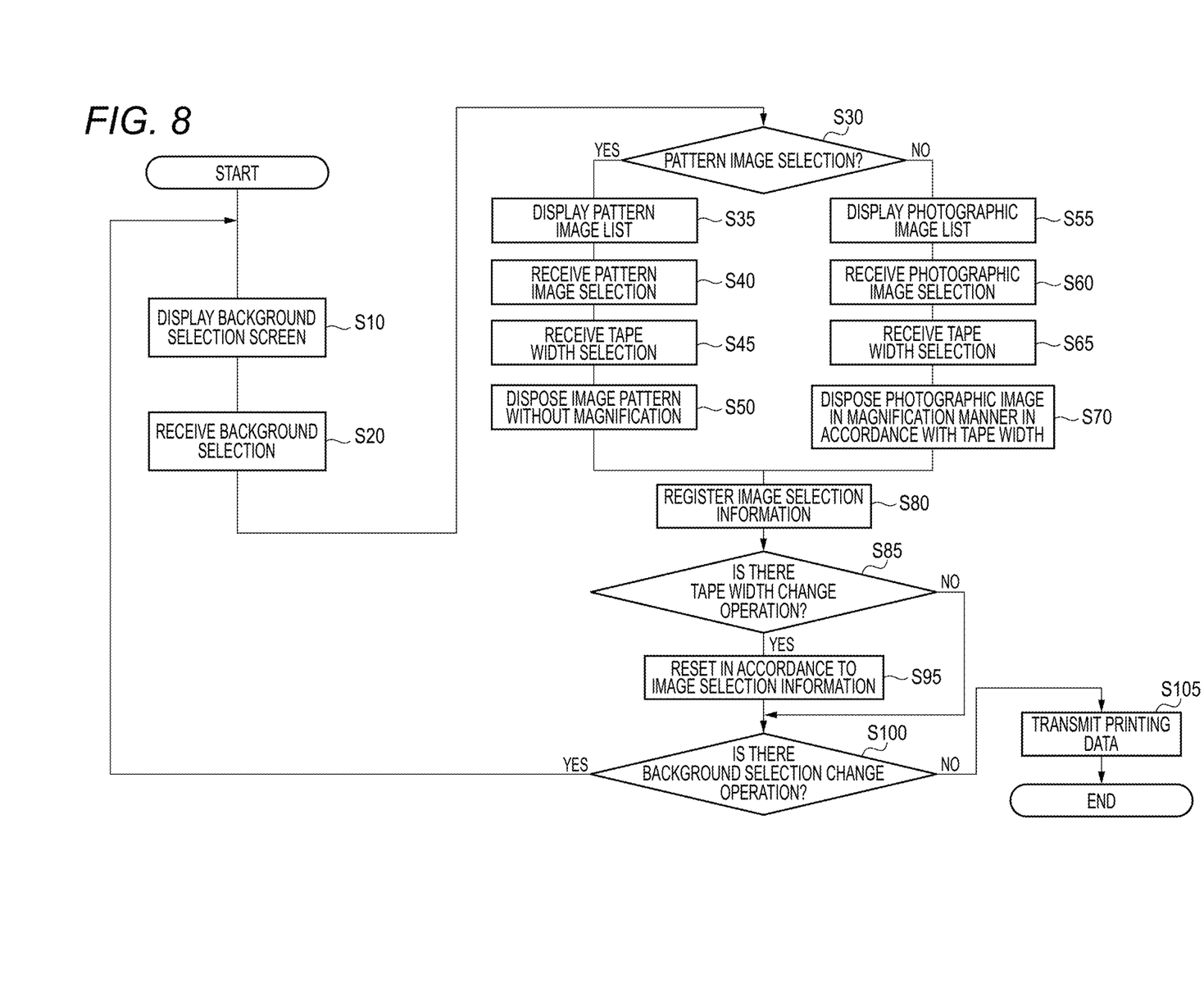
FIG. 8 is a flowchart of a control procedure executed by a control circuit of the operation terminal based on a printing processing program according to an embodiment of the present invention.

Further, the flowchart shown in FIG. 8 does not limit the present invention to the procedure shown in the above flow, and procedures may be added or deleted or an order may be changed without departing from the spirit and scope of the invention.

In addition to those described above, the methods according to the above-described embodiment and the modifications may be used in combination as appropriate.

Though not specifically exemplified, the present invention should be put into practice with various changes made in a range not departing from its gist.

What is claimed is:

1. A non-transitory computer readable medium storing a printing processing program that causes a controller of a terminal device to execute a process for printing, the terminal device being connectable to a printing apparatus and including the controller and an operation unit, the printing apparatus being configured to print on a long printing medium to produce a printed matter, the process comprising:
   receiving a selection of a background image serving as a ground pattern of the printed matter through the operation unit;
   determining whether the background image selected by using the operation unit is a repeating pattern image in which a given image pattern is repeated or a non-repeating pattern image other than the repeating pattern image;
   in a case where it is determined in the determining that the background image is the repeating pattern image, not adjusting scale of the image pattern in first background image data corresponding to the repeating pattern image regardless of a width of the long printing medium;
   in a case where it is determined in the determining that the background image is the non-repeating pattern image, adjusting scale of second background image data corresponding to the non-repeating pattern image in accordance with the width of the long printing medium; and
   outputting printing data including the first background image data or the second background image data to the printing apparatus.

2. The non-transitory computer readable medium according to claim 1, wherein
   in a case where it is determined in the determining that the background image is the non-repeating pattern image, in adjusting the scale of the second background image data, the second background image data adjusted in scale is repeated a plurality of times along a longitudinal direction of the long printing medium, and the number of repetitions is set to be variable in accordance with the width of the long printing medium.

3. The non-transitory computer readable medium according to claim 2, wherein
   in a case where it is determined in the determining that the background image is the non-repeating pattern image, in adjusting the scale of the second background image data, a vertical direction of the second background image data emesis set to coincide with a width direction of the long printing medium, and a vertical-direction-dimension of the second background image data is adjusted in accordance with a width-direction-dimension of the long printing medium.

4. A printing processing method executed by a terminal device connected to a printing apparatus, the printing apparatus being configured to print on a long printing medium to produce a printed matter, the printing processing method comprising:
   receiving a selection of a background image serving as a ground pattern of the printed matter;
   determining whether the selected background image is a repeating pattern image in which a predetermined image pattern is repeated or a non-repeating pattern image other than the repeating pattern image;
   in a case where it is determined in the determining that the background image is the repeating pattern image, not adjusting scale of the image pattern in first background image data corresponding to the pattern image regardless of a width of the long printing medium;
   in a case where it is determined in the determining that the background image is the non-repeating pattern image, adjusting scale of second background image data corresponding to the non-repeating pattern image in accordance with the width of the long printing medium; and
   outputting printing data including the first background image data or the second background image data to the printing apparatus.

5. The printing processing method according to claim 4, wherein
   in a case where it is determined in the determining that the background image is the non-repeating pattern image, in adjusting the scale of the second background image data, the second background image data adjusted in scale is repeated a plurality of times along a longitudinal direction of the long printing medium, and the number of repetitions is set to be variable in accordance with the width of the long printing medium.

6. The printing processing method according to claim 5, wherein
   in a case where it is determined in the determining that the background image is the non-repeating pattern image, in adjusting the scale of the second background image data, a vertical direction of the second background image data is set to coincide with a width direction of the long printing medium, and a vertical-direction-dimension of the second background image data is adjusted in accordance with a width-direction-dimension of the long printing medium.

* * * * *